(12) United States Patent
Takagi et al.

(10) Patent No.: US 6,540,936 B1
(45) Date of Patent: Apr. 1, 2003

(54) ALDEHYDE GAS ABSORBENT AND PROCESS FOR ABSORBING ALDEHYDE GAS

(75) Inventors: Osamu Takagi, Aichi (JP); Toshio Hirukawa, Aichi (JP); Noriyuki Yamamoto, Aichi (JP)

(73) Assignee: Toagosei Co., Ltd., Tokyo (JP)

( * ) Notice: Subject to any disclaimer, the term of this patent is extended or adjusted under 35 U.S.C. 154(b) by 76 days.

(21) Appl. No.: 09/597,421

(22) Filed: Jun. 19, 2000

(51) Int. Cl.⁷ .......................... B01J 20/10; B01D 53/54
(52) U.S. Cl. ............... 252/184; 252/181.1; 252/181.3; 252/190
(58) Field of Search ............... 252/184, 194, 252/181.1, 181.3, 190

(56) References Cited

U.S. PATENT DOCUMENTS

| | | | | |
|---|---|---|---|---|
| 3,892,678 A | * | 7/1975 | Halasz et al. ............... 252/426 |
| 4,072,566 A | * | 2/1978 | Lynn ............................ 195/63 |
| 4,182,743 A | * | 1/1980 | Rainer et al. ............... 422/211 |
| 4,443,354 A | * | 4/1984 | Eian ............................ 252/190 |
| 4,604,110 A | * | 8/1986 | Frazier ......................... 55/74 |
| 5,174,959 A | * | 12/1992 | Kundu et al. ................. 422/59 |
| 5,203,991 A | * | 4/1993 | Kutsuna et al. ........... 210/198.2 |
| 5,284,892 A | * | 2/1994 | Brodie, III et al. ......... 524/251 |
| 5,391,426 A | * | 2/1995 | Wu ............................ 428/246 |
| 5,942,297 A | * | 8/1999 | Speer et al. ................ 428/35.4 |
| 6,039,892 A | * | 3/2000 | Himeshima et al. ... 252/188.28 |

FOREIGN PATENT DOCUMENTS

| | | | | |
|---|---|---|---|---|
| JP | 51-44587 | | 4/1976 | ........... B01D/53/16 |
| JP | 63-141642 | | 6/1988 | ........... B01J/20/26 |
| JP | 4-200742 | | 7/1992 | ........... B01J/20/22 |
| JP | 11-166140 A | * | 6/1999 | |
| JP | 11-172574 A | * | 6/1999 | |
| JP | 2000-140633 A | * | 6/2000 | |

* cited by examiner

Primary Examiner—Joseph D. Anthony
(74) Attorney, Agent, or Firm—Sughrue Mion, PLLC

(57) ABSTRACT

An aldehyde gas absorbent comprising: a porous silicon dioxide having a specific surface area of from 400 to 900 m²/g and an average pore size of from 0.1 to 10 nm; and a polyamine compound carried on the porous silicon dioxide in an amount of from 0.02 to 2.0 mmol/g, said polyamine compound being represented by the following formula:

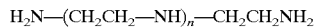

$$H_2N-(CH_2CH_2-NH)_n-CH_2CH_2NH_2$$

wherein n stands for an integer of from 0 to 3. Also disclosed are a process for absorbing an aldehyde gas and an aldehyde gas-absorbing article using the aldehyde gas absorbent.

9 Claims, No Drawings

ALDEHYDE GAS ABSORBENT AND PROCESS FOR ABSORBING ALDEHYDE GAS

BACKGROUND OF THE INVENTION

1. Field of the Invention

This invention relates to an aldehyde gas absorbent and a process for absorbing an aldehyde gas.

The process according to the present invention pertains to a process for adding an aldehyde gas absorbent to fiber, paper, a molding resin or a coating composition, thereby imparting thereto aldehyde gas absorbing power.

2. Description of the Related Art

In recent years, there is a rapidly increasing demand for deodorization. Among offensive odors to be deodorized, that of cigarettes have been regarded as a particularly serious problem. The odor of cigarettes is mainly composed of acetaldehyde, nicotine, pyridine and acetic acid gas.

There has been an attempt to impart deodorizing properties to various furnishings such as curtains, wall paper and the like for a house, hospital or the like and to fiber utilized for the air conditioner of an automobile, filter of electric appliances, clothes or the like.

It has been known that amine compounds have high affinity with an aldehyde gas so that an aldehyde gas in an exhaust gas can be removed by bringing the aldehyde-gas-containing exhaust gas into contact with a solution having an amine compound dissolved therein (JP-A-51-44587 (the term "JP-A" as used herein means an "unexamined published Japanese patent application"). The amine compound in the liquid form is however not suitable for use in the daily necessaries.

A gas absorbent having an amine compound carried on a heat resistant inorganic substance has been known and it is resistant to heating treatment suffered upon addition of it to a resin, paper or a film.

For example, known are a gas absorbent having an ammonium salt, aniline or the like carried on activated carbon (JP-A-53-29292, JP-A-56-53744); an absorbent having a compound, which contains in a molecule thereof a primary amino group, carried on a magnesium silicate clay mineral (JP-A-9-28778); and an absorbent having a polyamine compound carried between layers of a layered phosphate (α-zirconium phosphate) (Tsubafuru, et al., PHARM. TECH. JAPAN, 12, 12, 77–87(1996)).

In addition, known are a carbon dioxide gas absorbent having an amino alcohol carried on silica (JP-B-53-23899); a deodorizer having a polyallylamine carried on silica (JP-B-63-141642); and a carbon dioxide gas absorbent having both water and an amine compound, which has a molecular weight per N atom of 110 or less and a boiling point of at least 100° C., carried on silica gel (JP-B-4-200742). However, it is hardly considered that these gas absorbents have aldehyde gas-absorbing power sufficiently satisfying requirements at an industrially level.

The gas absorbent employing activated carbon as a carrier is not usable in the sanitation-related fields because coloring occurs when it is kneaded into a resin or fiber.

SUMMARY OF THE INVENTION

An object of the present invention is to provide an aldehyde gas absorbent which has a specific polyamine compound carried on a specific porous silicon dioxide to have an improved aldehyde gas-absorbing power.

Another object of the present invention is to provide a process for absorbing an aldehyde gas using the aldehyde gas absorbent.

A still other object of the present invention is to provide an aldehyde gas absorbing article comprising the aldehyde gas absorbent.

Other objects and effects of the invention will become more apparent from the following description.

The above-described objects of the present invention have been achieved by providing the following absorbent, process and article:

An aldehyde gas absorbent comprising:
    a porous silicon dioxide having a specific surface area of from 400 to 900 m²/g and an average pore size of from 0.1 to 10 nm; and
    a polyamine compound carried on the porous silicon dioxide in an amount of from 0.02 to 2.0 mmol/g, said polyamine compound being represented by the following formula:

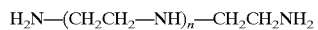

wherein n stands for an integer of from 0 to 3;

A process for absorbing an aldehyde gas, which comprises incorporating an aldehyde gas absorbent as defined above in a medium; and An aldehyde gas-absorbing article comprising a medium and an aldehyde gas absorbent as defined above.

DETAILED DESCRIPTION OF THE INVENTION

The aldehyde gas absorbent (which will hereinafter be abbreviated as "absorbent") according to the present invention has a polyamine compound carried on the specific silicon dioxide described below. The amount of the polyamine compound carried on the silicon dioxide is 0.02 to 2 mmol, preferably from 0.2 to 1.1 mmol, per gram of the absorbent. When the amount is too small, the aldehyde gas absorbing power lowers. When the amount is too large, on the other hand, not only the polyamine compound becomes a cause for coloration, coming out from the silicon oxide by heating upon kneading with a resin or fiber but also the polyamine compound itself becomes an offensive odor, which reduces the absorption amount of an aldehyde gas. The amount of the polyamine compound carried on the silicon dioxide can be easily calculated from the nitrogen content detected by organic element analysis.

The absorbent according to the present invention preferably has an elution amount of the polyamine compound in terms of a nitrogen concentration, as measured by the following testing method, of 1 ppm or less.
(Testing Method)
In a polyethylene bottle, 1 g of a sample and 100 ml of pure water are charged, followed by shaking at 40° C. for 60 hours. The contents in the polyethylene bottle are filtered and the nitrogen concentration of the filtrate is measured.

The absorbent having less elution amount of a polyamine compound is excellent in the aldehyde gas absorbing power and heat discoloration resistance.

The absorbent according to the present invention is usually obtained in powdery form and it preferably has an average particle size of from 0.01 to 50 μm, more preferably from 0.1 to 20 μm, still more preferably from 0.1 to 5 μm. Absorbents having an average particle size less than 0.01 μm are not preferred, because it is accompanied with such problems as difficulty in handling and tendency to re-coagulation. Absorbents having an average particle size greater than 50 μm, on the other hand, are not preferred, because it is accompanied with such problems as difficulty in uniform dispersion in a resin and occurrence of yarn breakage upon spinning.

The absorbent of the present invention is effective for the absorption of an aldehyde gas. Examples of the aldehyde gas include acetaldehyde, formaldehyde, nonenal, crotonaldehyde and aryl aldehydes.

Silicon Dioxide

The silicon dioxide for use in the present invention is a porous silicon dioxide having a specific surface area of from 400 to 900 m$^2$/g and an average pore size of from 0.1 to 10 nm. It preferably has a specific surface area of from 500 to 900 m$^2$/g and an average pore size of from 2 to 8 nm.

Excessively small specific surface areas reduce the contact area of the polyamine compound with an aldehyde gas, thereby decreasing the gas absorption amount. Excessively large specific surface areas, on the other hand, tend to cause heat discoloration upon addition and kneading of a resin. The specific surface area can easily be determined by calculating the nitrogen absorption amount in accordance with the BET method.

Excessively large average pore sizes of the porous silicon dioxide bring about a reduction in the specific surface area, which lowers the amount of the polyamine compound carried thereon, thereby deteriorating the aldehyde gas absorption capacity. When the specific surface area is adjusted to a satisfactory size in spite of a too large average pore size, the void in the porous body becomes excessively large, which causes a deterioration in the mechanical strength or lowers the carrying capacity of the polyamine compound, resulting in the problem that the silicon dioxide inevitably releases the polyamine compound even by slight heating. When the average pore size is too small, on the other hand, the specific surface area of the silicon dioxide increases, but the polyamine compound cannot enter the pore easily, which makes it impossible to increase the carrying amount of the polyamine compound, leading to a decrease in the gas absorption capacity. The average pore size (D) can be calculated easily from the equation shown below, with using the pore volume and specific surface area determined by the BET method.

$$D = 4 \times V/Sc \times 10^4$$

wherein

V: pore volume (ml/g), and

Sc: specific surface area (m$^2$/g)

The preferred water content of the silicon dioxide of the present invention is from 0.1 to 10 wt. %, more preferably from 0.1 to 5 wt. %.

At a water content less than 0.1 wt. %, the silicon dioxide does not have a sufficient amount of silanol groups on its surface and therefore, its carrying capacity of the polyamine compound of the present invention is small. At a water content greater than 10 wt. %, on the other hand, the silicon dioxide becomes a cause for coloration, foaming or deterioration upon kneading with a resin.

The porous silicon dioxide can be dried, for example, by heating or pressure reduction. Either one can be employed.

Although the drying degree may be adjusted as needed, it is general that the larger the amount of the amine compound to be carried on the porous silicon dioxide is, the more the drying degree is heightened.

The water content of the porous silicon dioxide can be measured easily by the thermogravimetric analysis.

For example, the water content can be easily calculated, as a ratio of the heating loss to the weight of the silicon dioxide before heating, by heating the porous silicon dioxide at a rate of 10° C./min from room temperature to 500° C. and then measuring the heating loss by using a differential thermogravimeter ("Model TG-DTA220", trade name; manufactured by Seiko Instruments Inc.).

Polyamine Compound

The polyamine compound for use in the present invention contains in the molecule thereof a primary amino group and is represented by the following formula:

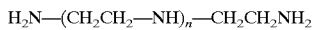

wherein n stands for an integer of from 0 to 3 and is preferably 1 or 2.

The above-described polyamine compound is in liquid form at room temperature, has high decomposition and boiling points and contains a primary amino group, which has high reactivity with an aldehyde gas.

Preparation Process of the Absorbent

The absorbent according to the present invention is easily obtained by mixing the above-described silicon dioxide and polyamine compound.

The polyamine compound can be carried on the silicon dioxide uniformly by diluting the polyamine compound with water or the like and then mixing it with the silicon dioxide. In general, an excess amount of the polyamine compound is mixed with the silicon dioxide. Therefore, the resulting substance is then washed with pure water to remove the excessive polyamine compound adhered onto the surface of the silicon dioxide. The washed substance is then dried at 50 to 120° C., to thereby obtain the absorbent according to the present invention.

For preparing the absorbent of the present invention, the following process is particularly preferred. Specifically, after the water content of the porous silicon dioxide, which has a specific surface area of from 400 to 900 m$^2$/g and an average pore size of from 0.1 to 10 nm, is adjusted to 0.1 to 10 wt. %, the polyamine compound of the present invention is carried thereon in an amount of 0.02 to 2.0 mmol/g.

The above-described process does not need a washing step so that an amine effluent which may cause environmental pollution is not discharged and in addition, a drying step after washing is not required, which makes it possible to easily prepare an absorbent having high aldehyde removing properties and heat discoloration resistance.

The process is characterized by the use of porous silicon dioxide having a specific water content as a carrier of the polyamine compound. Compared with the ordinarily employed porous silicon dioxide having a water content not less than several tens wt. %, the porous silicon dioxide used in the preferred process of the present invention has been dried highly. The water content is preferably from 0.1 to 5 wt. %, more preferably from 0.1 to 2 wt. %, particularly preferably from 0.1 to 1 wt. %.

In order to easily prepare an absorbent which does not elute the polyamine compound much, it is effective to adjust the water content of the porous silicon dioxide to from 0.1 to 10 wt. % and then allow the polyamine compound to be carried thereon in an amount of from 0.02 to 2.0 mmol/g.

Although there is no particular limitation imposed on the timing to allow the polyamine compound to be carried on the porous silicon dioxide, it is generally preferred to perform the carrying step immediately after the drying step during the preparation of the porous silicon dioxide or immediately after the drying step after the preparation of the porous silicon dioxide. An absorbent excellent in heat discoloration resistance can be obtained by allowing the polyamine compound to be carried immediately after the drying step of the porous silicon dioxide.

Mixing of the polyamine compound with the porous silicon dioxide or pulverization of the resulting mixture can be effected using an ordinarily-employed mixer such as Henschel mixer, oscillating mill or ball mill. It is also possible to classify the absorbent as needed by a commonly employed classifier such as vibration sieve or cyclone.

Applications of the Absorbent

The absorbent according to the present invention is substantially free from deterioration such as lowering in the aldehyde gas absorbing power or discoloration, even when heated at 200° C. or higher or exposed to ultraviolet rays, and thus is stable against high temperature or exposure to light.

The absorbent of the present invention is white in color and even when it is incorporated in a resin, the resin is not colored.

In addition, the absorbent of the present invention scarcely elutes the polyamine compound even when brought into contact with water.

Accordingly, the absorbent of the present invention can be formed or molded into a desired shape after incorporated in various resins or paper, without causing a problem of deterioration due to high temperature or light. Moreover, the formed or molded product is, upon storage and use, substantially free from limitations concerning heating temperature or shading.

The absorbent according to the present invention can impart an article such as molded resin articles, wall paper, fiber, films, coating compositions, covering agents, floor and wall materials, building materials, paper and the like with aldehyde gas absorbing power by being incorporated therein.

The absorbent of the present invention has a reactive-type absorption mechanism so that it is effective for the applications requiring a high gas absorption rate.

Articles having incorporated therein the absorbent of the invention such as a molded resin article, wall paper, fiber, a coating composition, paper, leather, plywood and a spray agent are described below.

Molded Resin Article

The absorbent of the present invention can easily impart a molded article of a resin with an aldehyde gas absorbing power by mixing with the resin and then molding the resulting mixture. Preferred examples of the resin include polyester, nylon, acrylics, polyethylene, polypropylene, polyvinyl, polyvinylidene, polyurethane, polyvinyl chloride and polystyrene resins. Each of these resins may be either a homopolymer or a copolymer.

The absorbent of the present invention is preferably added to the resin in an amount of from 0.1 to 20 parts by weight, more preferably from 0.5 to 10 parts by weight, per 100 parts by weight of the resin.

To the resin, additives such as delustering agent, colorant, antioxidant, fluorescent brightener, stabilizer, thickener, flame retardant, antibiotic, mildewproofing agent, mothproofing agent, infrared ray absorbent or ultraviolet ray absorbent can be added in a conventional manner.

Wall Paper

There are three raw materials for wall paper, that is, paper, cloth and resin. Paper includes Japanese paper and machine-made paper. The latter is rich in color and pattern, light and easy to bond. It is classified into salbura, tekko, mica, crepe, satin, bronze and the like, depending on the surface finish. The Japanese paper is accompanied with the drawbacks such as low mechanical strength and poor stain resistance, but mechanical strength and stain resistance can be improved by processing the surface with a resin.

Cloth-made wall paper is excellent in sound absorbing qualities and heat insulating properties. Examples of the cloth used for it include silk.wool fabrics, chemical fibers, paper textile, hemp cloth, cotton cloth and glass fiber cloth. These materials are usually lined with senkashi (hand-made paper) or kraft paper.

It is also possible to line a polyvinyl chloride film with paper, cotton cloth, victoria lawn or the like and impart it with appearance of some material by embossing or printing. The resulting film is poor in air permeability but rich in waterproofness so that it can be used in a bath room, lavatory and the like. A laminate film prepared by printing grain patterns or textile patterns on the surface of paper and then laminating thereon a clear polyvinyl chloride film can be used widely for the decoration of the interiors of houses.

Specific examples of a resin suitable as a material or laminating material of wall paper include polyvinyl chloride resin, polyethylene resin and polypropylene resin.

The above-described resin may be a copolymer as well as a homopolymer. The copolymer includes copolymers of the monomer constituting the resin and an other monomer copolymerizable therewith and graft copolymers obtained by grafting, on the monomer constituting the resin, an other monomer copolymerizable therewith.

Preferred examples of the monomer copolymerizable with vinyl chloride include $\alpha$-olefins such as ethylene, vinyl esters such as vinyl acetate, vinyl ethers such as butyl vinyl ether, esters of (meth)acrylic acid, aromatic vinyl compounds such as styrene, halogenated vinyls such as vinylidene chloride, and N-substituted maleimides such as N-cyclohexyl maleimide. Two ore more of these monomers may also be copolymerized. In the wall paper of the present invention, the absorbent is preferably added in an amount of from 0.01 to 30 wt. %, more preferably from 0.5 to 20 wt. %, most preferably from 1 to 15 wt. % based on the weight of deodorizing wall paper.

To wall paper having a resin layer, it is possible to add a blowing agent, processing assistant, lubricant, antifogging agent, antioxidant, ultraviolet light absorber, flame retardant, filler, colorant, stabilizer or the like to a resin component.

The deodorizing wall paper of the present invention may be obtained by allowing the above-described absorbent to be carried on a wall paper material such as paper, cloth or resin.

For example, the case where a resin is used as a base material for the deodorizing wall paper is described below.

Such wall paper can be obtained by adding the absorbent of the present invention to a base material resin, kneading the resulting mixture in a roll mill, forming the kneaded mass into a sheet on the surface of a releasing material by calendering and releasing the sheet from the releasing material; or rolling and calendering the base material resin, applying thereto an absorbent having a binder incorporated therein and then drying.

There is no particular limitation imposed on the method of attaching the wall paper. Direct adhesion, facing after lining or any other method can be employed for the attachment.

The deodorizing wall paper according to the present invention is excellent in deodorization of volatile smelly substances such as formaldehyde emitted from building materials such as wall board. The discoloration or deterioration of deodorizing properties does not occur even by heating it.

Coating Composition

A coating composition generally contains film-forming components such as main film component, plasticizer, curing agent, emulsifying agent, dispersant and pigment which is added as needed, and a film-forming assistant component including a solvent, diluent and the like.

As the main film component in the present invention, any one of natural vegetable oils, natural resins, semi-synthetic resins and synthetic resins can be used. Alternatively, either a thermoplastic resin or thermosetting resin can be employed.

Specific examples of the fat or oil include drying oils such as linseed oil and semidrying oils, while those of the resin include rosins, ethyl cellulose, cellulose acetate butyrate, benzyl cellulose, novolak or resol type phenol resins, alkyd resins, aminoalkyd resins, acrylic resins, polyvinyl chloride, silicone resins, homopolymer type thermoplastic, copolymer type thermoplastic, modified type thermoplastic or thermosetting fluorine resins, epoxy resins, urethane resins, saturated polyester resins, melamine resins and polyvinylidene chloride resins.

The coating composition of the present invention is in the liquid form. Either a solution or dispersion may be used. As a solvent, any one of lipophilic organic solvents, hydrophilic organic solvents and water can be used.

The coating composition of the present invention may be set by any mechanism. Specific examples of the setting mechanism include oxidative polymerization, humidity setting, thermosetting, catalytic setting, ultraviolet-light setting and polyol setting.

Preparation Process of Coating Composition

The coating composition of the present invention can be easily obtained by mixing the above-described absorbent and coating components in a conventional manner by using an ordinarily employed mixer such as ball mill.

The absorbent is preferably added to the liquid coating composition of the present invention in an amount capable of imparting the resulting film with aldehyde gas absorbing effects without damaging the properties of the coating composition, more specifically, in an amount of from 0.1 to 10 wt. % ("wt. %" will hereinafter be abbreviated as "%") based on the solid content of the coating composition. If it is desired to use the resin, which is contained the liquid coating composition of the present invention, as a binder for the absorbent and allow a large amount of the absorbent to adhere to a target substance, thereby permitting the target substance to exhibit aldehyde gas absorbing properties, the absorbent is preferably added in an amount of from 10 to 60% based on the solid content of the coating composition. It is possible to increase the amount of the absorbent as needed for the long lasting exhibition or quick exhibition of the aldehyde gas absorbing effects.

Applications and Setting Method

There is no particular limitation imposed on the method of applying the coating composition of the present invention. Depending on the properties of the coating composition, an appropriate method is selected from brushing, spray coating, dip coating or the like.

No particular limitation is imposed on the setting method of the coating composition of the present invention and any one of cold setting, heating and exposure to ultraviolet rays, visible light, electron beams or the like can be employed.

Scope of Application

Examples of the objects to which the coating composition is applied include: buildings such as hospitals, schools, houses, food plants; transportation means such as automobiles, airplanes and railway vehicles; interior finishes of a house such as walls, ceilings and floors of a bathroom, lavatory or kitchen; and electric appliances such as refrigerator and microwave oven. The coated film formed by applying the coating composition of the present invention to the surface of such an object is able to absorb offensive odors such as acetaldehyde which is a cause for the smell of cigarettes or formaldehyde smell emitted from wall paper or the like.

The coated film formed by the application of the coating composition of the present invention exhibits excellent absorbing properties against an aldehyde gas without damaging its weather resistance.

Deodorizing Fiber

The deodorizing fiber of the present invention have the above-described absorbent incorporated in fiber.

As the fiber, either natural fibers or synthetic fibers and any one of short fibers, long fibers and composite fibers having a core-sheath structure can be employed.

Since the absorbent of the present invention has excellent heat resistance, deodorizing properties of it are not deactivated even when it is exposed to high temperature up to 200° C. at the stage of adding the absorbent to a fiber resin. It is therefore possible to use any resin conventionally used as a fiber resin.

Preferred examples of the natural fiber include pulp, hemp, cotton, silk and wool, while those of the synthetic fiber include polyester, nylon, acrylics, polyethylene, polyvinyl alcohol, polyvinylidene, polyurethane and polystyrene. As a resin for the synthetic fiber, either a homopolymer or a copolymer may be employed.

No particular limitation is imposed on the incorporating method of the absorbent in the fiber. It is incorporated, for example, by melt spinning, dry spinning or wet spinning of a fiber resin which has the absorbent incorporated therein in advance; or by allowing an aqueous or organic suspension containing the absorbent and a binder to adhere on the surface of the fiber by coating, dipping or the like method and then removing the solvent. In order to improve the dispersibility of the absorbent, a surfactant, a dispersant or the like can be added to the above-described aqueous or organic suspension. Any one of anionic, nonionic and cationic surfactants can be employed as the surfactant. As the binder for heightening the adhesion to the fiber surface, any binder can be employed without limitation insofar as adhesion is exhibited after the removal of the solvent.

The absorbent is preferably incorporated in the fiber in an amount of from 0.1 to 20 parts by weight ("parts by weight" will hereinafter be abbreviated as "parts"), more preferably from 0.5 to 10 parts based on 100 parts of the natural fiber or synthetic fiber resin.

It is possible to add as needed, to the fiber, various additives such as gas decomposer, delustering agent, colorant, antioxidant, fluorescent brightener, stabilizer, flame retardant, antibiotic, mildewproofing agent, aromatic, mothproofing agent, infrared light absorber and ultraviolet light absorber.

Applications of the Deodorizing Fiber

The deodorizing fiber of the present invention can be used for a large number of fiber products such as underwear, socks, comforters, carpets, curtains, masks, handkerchiefs, hats, paper, nonwoven clothes and towels.

The deodorizing fibers according to the present invention can be used as raw materials for various deodorizing fiber products such as composite fibers, woven clothes and nonwoven clothes.

Paper

The paper for use in the present invention includes a natural pulp and a synthetic pulp. Preferred examples of the natural pulp include wood pulp, while preferred examples of the synthetic pulp include polypropylene, polyethylene, alumina fibers, carbon fibers and glass fibers.

The aldehyde gas absorbent can be easily incorporated in the paper by a known method such as paper manufacturing, coating, dipping or spraying.

The amount of the absorbent to be incorporated in the paper is preferably from 1 to 20 wt. %.

The paper containing the aldehyde gas absorbent is useful as, for example, a sanitary pad, packaging paper, paper for transportation or a corrugated board.

Leather

Preferred examples of the leather for use in the present invention include cowhide, sheepskin, pigskin, horsehide, kangaroo skin and goat skin. Leathers manufactured by any method can be used in the present invention.

The absorbent of the present invention may be incorporated in the leather by a known method, such as adhering the absorbent to the leather with a binder, or impregnating the leather with a liquid having the absorbent dispersed therein.

The amount of the absorbent to be incorporated in the leather is preferably from 1 to 20 wt. %.

Plywood

The plywood for use in the present invention preferably comprises veneers, which are bonded to each other and each of which is made of wood such as cedar, pine or lauan. The absorbent according to the present invention may be incorporated in the plywood by a known method, such as adhering the absorbent to the plywood with a binder, or impregnating the plywood with a liquid having the absorbent dispersed therein.

The amount of the absorbent to be incorporated in the plywood is preferably from 1 to 20 wt. %.

Spray Agent

A spray agent can be obtained by dispersing the absorbent according to the present invention uniformly in a volatile liquid. Preferred examples of the volatile liquid include known hydrocarbon liquids such as isobutane.

The amount of the absorbent to be incorporated in the volatile liquid is preferably from 1 to 20 wt. %.

EXAMPLES

Comparative Examples

The present invention will be described in greater detail with reference to the following Examples and Comparative Examples, but the invention should not be construed as being limited thereto.

The process for preparing absorbents conducted in Examples 1 to 10 and Comparative Examples 1 to 11 (which process will hereinafter be referred to as "absorbent preparation process (1)) and various testing methods for evaluating the resulting absorbents are as described below.

Absorbent Preparation Process

To a predetermined amount of a polyamine compound, 1 g of powdery silicon dioxide is added, followed by the addition of 10 g of pure water. The resulting mixture is stirred sufficiently. The reaction mixture is then shaken at 40° C. for 2 hours. The slurry thus obtained is filtered through a Buchner funnel and the filtrate is washed with pure water until its electric conductivity becomes 20 $\mu$S/cm or less.

The powder thus washed is dried at 100° C. for 12 hours, whereby the absorbent is prepared.

Evaluation Test of Aldehyde Absorbing Power

A predetermined amount of an acetaldehyde gas was poured into a tedlar bag (a polyethylene bag for gas adsorption test) containing a predetermined amount of the absorbent obtained above. The tedlar bag was lightly pressed by hands to uniformly fill the bag with the acetaldehyde gas. The concentration of the acetaldehyde gas in the tedlar bag two hours after pouring was measured by a detection tube (product of Gastec NV). In the above-described manner, the aldehyde-gas absorbing power was evaluated based on the concentration of the aldehyde gas which had decreased from the initial aldehyde gas concentration (20 ppm) and remained in the bag.

Measurement of Carried Amine Compound Amount

The amount of the amine compound carried on the absorbent was calculated from the nitrogen amount detected by an organic element analyzer ("CHN Coder MT-5", trade name; manufactured by Yanagimoto Seisakujo) and the nitrogen content of the polyamine compound carried on the absorbent.

Measurement of Water Content of Silicon Dioxide

Heating loss of silicon dioxide was measured as its water content by heating it at 10° C./min from room temperature to 500° C. by using a differential thermogravimeter ("Model TG-DTA 220", trade name; product of Seiko Instruments Inc.).

Examples 1 and 2 and Comparative Examples 1 and 2

Influence of Carried Polyamine Compound Amount on Absorbent

In Examples 1 and 2 and Comparative Examples 1 and 2, absorbents having a polyamine compound carried thereon in varied amounts were obtained by mixing 0.02 g of powder A (silica gel having a specific surface area of 680 m$^2$/g and an average pore size of 2.5 nm) and 0.01 to 0.4 mmol of tetraethylene pentamine.

The absorbents thus obtained were subjected to the above-described evaluation test of aldehyde gas absorbing power. The amount of the polyamine compound (PA) carried on the absorbent and results (residual concentration of an aldehyde gas; C) of the evaluation test of acetaldehyde-gas absorbing power were as shown in Table 1. It should be noted that when the residual concentration of an aldehyde gas is indicated by "not detected", the concentration of the aldehyde gas is not greater than 1 ppm which is the limit of detection (this definition will be applied equally hereinafter).

TABLE 1

| Sample | PA (mmol/g) | C (ppm) |
| --- | --- | --- |
| Example 1 | 0.57 | Not detected |
| Example 2 | 1.0 | Not detected |
| Comp. Ex. 1 | 0.01 | 15 |
| Comp. Ex. 2 | 2.8 | 10 |
| Blank | — | 19 |

Examples 3 to 5 and Comparative Examples 3 to 5

Influence of Average Pore Size and Specific Surface Area of Porous Silicon Dioxide Acetaldehyde absorbents were each obtained by mixing 0.02 g of each of porous silicon dioxides different in average pore size and also in specific surface area and 0.05 mmol of tetraethylene pentammine.

The aldehyde gas absorbing power of the resulting absorbents was evaluated.

The specific surface area (s) and average pore size (d) of the porous silicon dioxide employed, amount of the polyamine compound (PA) carried on the absorbent and result of the evaluation test of the acetaldehyde gas absorbing power (residual concentration of an acetaldehyde gas) (C) were as shown in Table 2.

TABLE 2

| Sample | s (m²/g) | d (nm) | PA (mmol/g) | C (ppm) |
|---|---|---|---|---|
| Example 3 | 680 | 2.5 | 0.57 | Not detected |
| Example 4 | 800 | 2.5 | 0.55 | Not detected |
| Example 5 | 480 | 8.0 | 0.19 | Not detected |
| Comp. Ex. 3 | 290 | 21.0 | 0.10 | 16 |
| Comp. Ex. 4 | 950 | 3.0 | 0.41 | 16 |
| Comp. Ex. 5 | 410 | 21.0 | 0.12 | 16 |
| Blank | | | — | 19 |

Example 6 and Comparative Examples 6 and 7

Influence by the Kind of Carrier

Absorbents were each obtained by mixing 0.02 g of each of various carriers and 2.5 mmol of diethylene triamine. The amount of the polyamine compound (PA) carried on the resulting absorbent and the results of the evaluation test of acetaldehyde gas absorbing power (residual concentration of an aldehyde gas) (C) were as shown in Table 3.

TABLE 3

| Sample | Carrier | PA (mmol/g) | C (ppm) |
|---|---|---|---|
| Example 6 | Silica gel | 0.54 | Not detected |
| Comp. Ex. 6 | α-zirconium phosphate | 1.04 | 19 |
| Comp. Ex. 7 | Sepiolite | 0.05 | 17 |
| Blank | — | | 19 |

Examples 7 and 8 and Comparative Example 8

Influence of the Kind of an Amine Compound

Absorbents were each obtained by mixing 0.02 g of powder A with 2.5 mmol of each of amine compounds. The amount of the amine compound (A) carried on the resulting absorbent and the results of the evaluation test on aldehyde gas absorbing power (residual concentration of an aldehyde gas) (C) were as shown in Table 4.

TABLE 4

| Sample | Amine compound | A (mmol/g) | C (ppm) |
|---|---|---|---|
| Example 7 | Diethylene triamine | 0.57 | Not detected |
| Example 8 | Triethylene tetrammine | 1.01 | Not detected |
| Comp. Ex. 8 | Urea | 0.05 | 19 |
| Blank | — | | 19 |

Examples 9 and 10 snd Comparative Examples 9 to 11

Influence of the Water Content of Silicon Dioxide

Absorbents were each obtained by mixing 0.01 g of each of silicon dioxides varied in water content and 2.5 mmol of a polyamine compound. The water content of the resulting absorbents, specific surface area of silicon dioxide and results of the evaluation test on acetaldehyde gas absorbing power (residual concentration of an aldehyde gas) (C) were as shown in Table 5. In the table, "Aerosil #200" is a trade name of the silicon dioxide produced by Nippon Aerosil Co., Ltd., while "Nipsil" is a trade mark of the silicon dioxide produced by Nippon Silica Industrial Co., Ltd.

TABLE 5

| Sample | Silicon dioxide | Water content (wt. %) | Specific surface area (m²/g) | C (ppm) |
|---|---|---|---|---|
| Example 9 | Silica gel | 8 | 680 | 1 |
| Example 10 | Silica gel | 7 | 480 | 5 |
| Comp. Ex. 9 | Fused silica | 0.3 | 1.8 | 18 |
| Comp. Ex. 10 | Aerosil #200 | 0.2 | 220 | 18 |
| Comp. Ex. 11 | Nipsil | 7 | 260 | 15 |
| Blank | | | | 19 |

Example 11

With 1N hydrochloric acid, 100 g of sodium silicate was neutralized, whereby a porous silicon dioxide gel was formed. After washing with pure water, the gel was filtered, followed by drying at 180° C. for 12 hours in a drier. On the resulting porous silicon dioxide (having a specific surface area of 680 m²/g, an average pore size of 2.5 nm, and a water content of 0.2 wt. %) just taken out from the drier, 0.46 mmol/g of diethylene triamine was carried and the mixture was pulverized in a pulverizer to have an average particle size of 5 μm, whereby an absorbent A was obtained. The amount of the polyamine compound carried on the absorbent was confirmed by the organic element analysis.

Experiment 1

Evaluation Test of Aldehyde Gas Absorbing Power

The aldehyde gas absorbing power of the absorbent A obtained in Example 11 was measured under the below-described conditions and the results were shown below in Table 6.

Testing conditions: In a 1-liter container containing 0.02 g of the sample and a container (blank) free of the sample, the same amounts of an acetaldehyde gas were poured, respectively. Two hours later, the gas concentration in each of the containers was measured by a detection tube (product of Gastec NV).

TABLE 6

| Absorbent | Gas concentration after 2 hours |
|---|---|
| A | 0.1 ppm or less |
| Blank | 50 ppm |

Experiment 2

Heat Discoloration Resistance

Colors (L, a, b) of the absorbent A before and after heating treatment at 220° C. for 10 minutes were measured using a calorimeter ("Colorimeter SZ-Σ80", trade name; product of Nippon Denshoku Kogyo Co., Ltd.) and color difference ΔE was determined. The results were shown below in Table 7.

TABLE 7

| | Before heating | | | After heating | | | |
|---|---|---|---|---|---|---|---|
| Absorbent | L | a | b | L | a | b | ΔE |
| A | 95.29 | 0.15 | 0.17 | 94.86 | 0.03 | 0.48 | 0.54 |

Experiment 3

Elution Test

The amount of the polyamine compound eluted into pure water from the absorbent A was measured under the below-described testing conditions. The result was indicated below in Table 8 by the nitrogen concentration detected by a trace nitrogen measuring instrument.

Testing conditions: In a polyethylene bottle, 1 g of the sample and 100 mL of pure water were charged, followed by shaking at 40° C. for 60 hours. The reaction mixture was then filtered through a membrane filter and the nitrogen concentration of the filtrate was measured.

TABLE 8

| Absorbent | Nitrogen concentration (ppm) |
|---|---|
| A | 0.1 or less |

From the above-described results in Tables 6 to 8, it has been found that the absorbent A is excellent in the capacity of deodorizing an aldehyde gas and heat discoloration resistance and that the amount of the polyamine compound eluted into pure water from the absorbent is small.

As is apparent from the preparation process of the absorbent in Example 11, the absorbent of the present invention scarcely adsorbed a $CO_2$ gas thereto even exposed to the air for 12 hours in the drying step and exhibits excellent aldehyde gas absorbing power in the subsequent evaluation test of aldehyde gas absorbing power.

Example 12

Powdery porous silicon dioxide (1 g) having a specific surface area of 680 $m^2/g$ and 0.6 mmol of diethylene triamine were mixed, followed by the addition of 10 g of pure water. The resulting mixture was stirred sufficiently. The reaction mixture was then treated in a similar manner to the above-described preparation process (1), whereby an aldehyde gas absorbent was obtained.

A vinyl chloride/acrylic surface treatment agent (solid content of the resin: 10%) containing 10 wt. % ("wt. %" will hereinafter be abbreviated as "%") of the resulting aldehyde gas absorbent was prepared, followed by application to a sheet of wall paper (1 mm×210 mm×297 mm) made of polyvinyl chloride to a thickness of 20 μm. By drying at 180° C. for 30 seconds, an aldehyde-gas-absorptive wall paper sheet having 1% of the absorbent carried thereon was obtained.

Example 13

To 100 parts by weight ("parts by weight" will hereinafter be abbreviated as "parts") of soft polyvinyl chloride, 1 part of the aldehyde gas absorbent prepared in Example 12 was added, followed by rolling and calendering at 150° C., whereby an aldehyde-gas-absorptive wall paper sheet (1 mm×210 mm×297 mm) was obtained.

The aldehyde-gas-absorptive wall paper sheets obtained in Examples 12 and 13 were both free from discoloration before and after the heating step.

Comparative Example 12

In a similar manner to Example 12 except that the absorbent was not carried, a wall paper sheet made of a polyvinyl chloride resin and having a polyvinyl chloride/ acrylic surface treatment agent applied thereto was obtained.

Comparative Example 13

In a similar manner to Example 12 except for the use of activated carbon ("Kuraraycoal GC-3H", trade name; product of Kuraray Co., Ltd.) as an absorbent, an aldehyde-gas-absorptive wall paper sheet was obtained.

The absorption of an aldehyde gas and release of the aldehyde gas once adsorbed to the resulting wall paper sheet were tested as described below by using thus obtained sheets and the results were shown below in Table 9.

Method for Testing the Absorption of an Aldehyde Gas Test on the Absorption of an Aldehyde Gas Each of the aldehyde-gas-absorptive wall paper sheets obtained in Examples and Comparative Examples was hermetically sealed in a tedlar bag (1 liter), followed by the addition of a predetermined amount of formaldehyde to adjust the initial formaldehyde concentration in the tedlar bag to 200 ppm. One hour later, the gas concentration in the tedlar bag was measured using a detection tube (product of Gastech Co., Ltd.).

Test on the Release of the Aldehyde Gas Once Adsorbed to the Sheet

Subsequent to the test on the absorption of an aldehyde gas, the aldehyde-gas-absorptive wall paper sheet was taken out from the tedlar bag. It was then put into another tedlar bag (1 liter), followed by hermetical sealing. Into the bag, 1 liter of the air was poured. After the bag was allowed to stand at 60° C. for 1 hour, the formaldehyde concentration released from the aldehyde-gas-absorptive wall paper sheet was measured.

TABLE 9

|  | Test on absorption of aldehyde gas | Test on release after absorption |
|---|---|---|
| Example 12 | <0.1 | <0.1 |
| Example 13 | <0.1 | <0.1 |
| Comp. Ex. 12 | 8 | 45 |
| Comp. Ex. 13 | 3 | 5 |

(Unit: ppm)

From the above-described results of Table 9, it has been found that the aldehyde-gas-absorptive wall paper sheets according to the present invention are excellent in formaldehyde absorption and in addition, do not release formaldehyde which has been once deodorized.

Examples 14 to 19

In a similar manner to the above-described preparation process (1), absorbents were prepared.

The preparation conditions of those absorbents were shown in Table 10.

Each of the absorbents A to F (Table 10) thus obtained was added in an amount of 2.0 parts by weight ("parts by weight" will hereinafter be abbreviated as "parts") to 100 parts of an urethane emulsion coating, whereby an aldehyde-gas-absorptive liquid coating composition was obtained. For comparison, a liquid coating composition without an absorbent was prepared (Comparative Example 14). Each of the coating compositions thus obtained was applied to an 5 cm×10 cm aluminum plate, followed by heating to form a film. The film was used as a sample.

Examples 20 to 23

Each of the absorbents A to F (Table 10) according to the present invention was added in an amount of 2.0 parts to 100 parts of an acrylic coating "M-7100" (trade name; product of Toagosei Chemical Industry Co., Ltd.), whereby an aldehyde-gas-absorptive liquid coating composition was obtained. For comparison, a coating composition without an absorbent was prepared (Comparative Example 15). The coating compositions thus obtained were each applied to a 5 cm×10 cm galvanized steel, followed by exposure to ultraviolet rays from a condenser type high-pressure mercury lamp to form a film. The resulting film was used as a sample.

TABLE 10

|  | Porous silicon dioxide | | Polyamine | |
| --- | --- | --- | --- | --- |
| Absorbent | Average pore size (nm) | Specific surface area (m$^2$/g) | Kind*$^1$ | Amount carried*$^2$ |
| (A) | 2.5 | 680 | 4E5A | 0.57 |
| (B) | 2.5 | 800 | 4E5A | 0.55 |
| (C) | 8.0 | 480 | 4E5A | 0.19 |
| (D) | 2.5 | 680 | 4E5A | 1.0 |
| (E) | 2.5 | 680 | 2E3A | 0.54 |
| (F) | 2.5 | 680 | 3E4A | 1.01 |

*$^1$4E5A: tetraethylene pentammine,
2E3A: diethylene triamine
3E4A: triethylene tetramine
*$^2$calculated from the amount of N detected by organic element analysis, unit: mmol/g Aldehyde Gas Absorption Test The samples obtained in Examples and Comparative Examples were each charged in two tedlar bags (each, 1 liter), followed by hermetical sealing. Then, two gases as shown below in Table 11 were poured into these bags, respectively. One hour after the gas was charged, the gas concentration in the tedlar bag was measured using a detection tube (product of Gastech Co., Ltd.). The initial gas concentration when the gas was poured into the tedlar bag was as shown below in Table 11.

The results of the test on the absorption of an aldehyde gas thus obtained were shown below in Table 12.

Weather Resistance Test

The weather resistance of each of the samples obtained in Examples and Comparative Examples was measured using a forced deterioration tester "UC-1" (trade name) manufactured by Toyo Seiki Seisaku-sho Co., Ltd. In the test using the weatherometer, one cycle lasts 8 hours and it comprises a 4-hour step for subjecting the sample to exposure to ultraviolet rays at 60° C. and 350 nm or less and another 4-hour step for allowing the sample to stand in an atmosphere at a temperature of 40° C. and a humidity of 95% or greater. After 5 successive cycles of the weather resistance test, colors (L, a, b) were measured using a colorimeter ("Colorimeter SZ-Σ80", trade name; product of Nippon Denshoku Kogyo Co., Ltd.) were measured. These colors were compared with those immediately after the formation of a film (0 cycle), whereby color difference ΔE was determined. The color deference ΔE of each of various aldehyde gas absorptive films were shown below in Table 12.

TABLE 11

| Test gas | Initial gas concentration after charge of test gas |
| --- | --- |
| Acetaldehyde | 50 ppm |
| Formaldehyde | 50 ppm |

TABLE 12

| Example No. | Absorbent | Coating | Concentration (ppm) CH$_3$CHO | Concentration (ppm) HCHO | Color difference ΔE |
| --- | --- | --- | --- | --- | --- |
| Example 14 | (A) | Urethane emulsion | 5 | 8 | 0.9 |
| Example 15 | (B) | Urethane emulsion | 4 | 8 | 1.2 |
| Example 16 | (C) | Urethane emulsion | 2 | 5 | 1.4 |
| Example 17 | (D) | Urethane emulsion | 1 | 4 | 0.6 |
| Example 18 | (E) | Urethane emulsion | ND | ND | 0.8 |
| Example 19 | (F) | Urethane emulsion | 2 | 5 | 1.9 |
| Example 20 | (A) | Acrylic emulsion | ND | ND | 1.6 |
| Example 21 | (C) | Acrylic emulsion | 3 | 5 | 0.9 |
| Example 22 | (D) | Acrylic emulsion | 3 | 8 | 1.6 |
| Example 23 | (F) | Acrylic emulsion | 3 | ND | 1.8 |
| Comp. Ex. 14 | — | Urethane emulsion | 49 | 49 | 0.9 |
| Comp. Ex. 15 | — | Acrylic emulsion | 50 | 49 | 1.8 |

Note) The term "ND" in the table indicates the value not greater than the limit of detection.

In the below-described Examples 24 to 35, the absorbents as shown in Table 10 were used.

Examples 24 to 35

A master batch was prepared in advance by mixing 20 part by weight of each of the absorbents (A to F) with 100 part by weight of a fiber resin composed of polyester or nylon. The resulting master batch was added to a resin for fiber products made of the same kind of the resin so that the ratio of the absorbent would be 2.5 wt. % based on the whole weight, followed by melt spinning in a conventional manner, whereby deodorizing fibers of about 2 denier were obtained. As a blank, fibers without an absorbent were produced (Comparative Examples 16, 17).

Examples 36 to 41

In each of Examples 36 to 41, to a polyester nonwoven cloth, 1.5 wt. % of an acrylic binder and 3 wt. % of each of the absorbents (A to F) were applied, followed by drying at 120° C. and curing (stretching) at 180° C., whereby an aldehyde-gas-absorptive nonwoven cloth was obtained. In addition, a nonwoven cloth free of an absorbent was produced (Comparative Example 18).

Experiment

Evaluation Test of Aldehyde Gas Absorbing Properties

The deodorizing fibers thus obtained were cut into pieces of about 10 cm in length and these pieces were provided for the experiment which will be described below.

Two kinds of gases as shown above in Table 11 were poured into two containers (1 liter) each containing 0.5 g of the sample, respectively, and two hours later, the gas concentration was measured using a detection tube (product of Gastech Co., Ltd.).

The results of the deodorization test thus obtained were shown below in Table 13.

TABLE 13

| Example No. | Absorbent | Resin | Gas concentration (ppm) | | Fiber |
|---|---|---|---|---|---|
| | | | $CH_3CHO$ | HCHO | |
| Example 24 | (A) | Nylon | ND | ND | |
| Example 25 | (A) | Polyester | 5 | ND | |
| Example 26 | (B) | Nylon | 5 | 3 | |
| Example 27 | (B) | Polyester | 5 | 3 | |
| Example 28 | (C) | Nylon | ND | ND | obtained |
| Example 29 | (C) | Polyester | ND | 3 | by melt |
| Example 30 | (D) | Nylon | ND | ND | spinning |
| Example 31 | (D) | Polyester | 4 | 3 | |
| Example 32 | (E) | Nylon | 2 | ND | |
| Example 33 | (E) | Polyester | 6 | 7 | |
| Example 34 | (F) | Nylon | ND | 4 | |
| Example 35 | (F) | Polyester | 7 | 8 | |
| Example 36 | (A) | Polyester | ND | 4 | |
| Example 37 | (B) | Polyester | 2 | 3 | |
| Example 38 | (C) | Polyester | ND | 3 | Nonwoven |
| Example 39 | (D) | Polyester | 6 | 7 | cloth |
| Example 40 | (E) | Polyester | 5 | 6 | |
| Example 41 | (F) | Polyester | 7 | 8 | |
| Comp. Ex. 16 | — | Nylon | 49 | 48 | |
| Comp. Ex. 17 | — | Polyester | 49 | 49 | |
| Comp. Ex. 18 | — | Polyester | 49 | 49 | |

Note) The term "ND" in the table indicates the value not greater than the limit of detection.

While the invention has been described in detail and with reference to specific embodiments thereof, it will be apparent to one skilled in the art that various changes and modifications can be made therein without departing from the spirit and scope thereof.

What is claimed is:

1. An aldehyde gas absorbent comprising:

a porous silicon dioxide having a specific surface area of from 400 to 900 m²/g and an average pore size of from 0.1 to 10 nm; and a polyamine compound carried on the porous silicon dioxide in an amount of from 0.02 to 2.0 mmol/g, said polyamine compound being represented by the following formula:

$$H_2N-(CH_2CH_2-NH)_n-CH_2CH_2NH_2$$

wherein n stands for an integer of from 0 to 3.

2. An aldehyde gas-absorbing article comprising a medium and an aldehyde gas absorbent as claimed in claim 1.

3. The aldehyde gas-absorbing article according to claim 2, wherein said medium is wall paper.

4. The aldehyde gas-absorbing article according to claim 2, wherein said medium is a liquid coating composition.

5. The aldehyde gas-absorbing article according to claim 2, wherein said medium is fiber.

6. The aldehyde gas-absorbing article according to claim 2, wherein said medium is paper.

7. The aldehyde gas-absorbing article according to claim 2, wherein said medium is leather.

8. The aldehyde gas-absorbing article according to claim 2, wherein said medium is plywood.

9. The aldehyde gas-absorbing article according to claim 2, wherein said medium is a spray agent.

* * * * *